(12) United States Patent
Erdel

(10) Patent No.: US 10,302,007 B2
(45) Date of Patent: May 28, 2019

(54) TURBINE HOUSING AND ASSOCIATED EXHAUST-GAS TURBOCHARGER

(71) Applicant: Bosch Mahle Turbo Systems GmbH & Co. KG, Stuttgart (DE)

(72) Inventor: Florian Erdel, Hambruecken (DE)

(73) Assignee: BMTS Technology GmbH & CO. KG (DE)

( * ) Notice: Subject to any disclaimer, the term of this patent is extended or adjusted under 35 U.S.C. 154(b) by 407 days.

(21) Appl. No.: 15/079,029

(22) Filed: Mar. 23, 2016

(65) Prior Publication Data
US 2016/0281590 A1    Sep. 29, 2016

(30) Foreign Application Priority Data

Mar. 24, 2015    (DE) .......................... 10 2015 205 329

(51) Int. Cl.
| | | |
|---|---|---|
| *F01D 1/00* | (2006.01) | |
| *F02B 37/00* | (2006.01) | |
| *F01D 9/02* | (2006.01) | |
| *F01D 9/04* | (2006.01) | |
| *F04D 17/12* | (2006.01) | |
| *F04D 29/42* | (2006.01) | |

(52) U.S. Cl.
CPC .............. *F02B 37/001* (2013.01); *F01D 1/00* (2013.01); *F01D 9/026* (2013.01); *F01D 9/045* (2013.01); *F04D 17/12* (2013.01); *F04D 29/4206* (2013.01)

(58) Field of Classification Search
None
See application file for complete search history.

(56) References Cited

U.S. PATENT DOCUMENTS

| | | | | |
|---|---|---|---|---|
| 4,177,005 A | * | 12/1979 | Bozung .................. | F01D 9/026 415/128 |
| 4,544,326 A | * | 10/1985 | Nishiguchi ............. | F01D 9/026 415/151 |
| 5,094,587 A | * | 3/1992 | Woollenweber ........ | F01D 9/026 415/205 |

(Continued)

FOREIGN PATENT DOCUMENTS

| | | | |
|---|---|---|---|
| DE | 102007048666 A1 | 4/2009 | |
| EP | 2778349 A1 * | 9/2014 | ............ F01D 9/026 |
| EP | 2803839 A1 | 11/2014 | |

OTHER PUBLICATIONS

English abstract for DE102007048666 (A1).
German Search Report for DE-102015205329.6, dated Feb. 1, 2016.

*Primary Examiner* — Jason D Shanske
*Assistant Examiner* — Theodore C Ribadeneyra
(74) *Attorney, Agent, or Firm* — Fishman Stewart PLLC

(57) ABSTRACT

A turbine housing of an exhaust-gas turbocharger may include at least two spiral-shaped exhaust-gas channels separated from one another via a partition. The at least two channels may be delimited radially to the outside by the turbine housing and radially to the inside by at least two spiral tongues. A first spiral tongue may be associated with one of the channels and a second spiral tongue may be associated with the other of the channels. The at least two spiral tongues may extend in opposite directions away from the partition in a direction towards the turbine housing. According to an example, the at least two spiral tongues may be configured such that, under an increasing thermomechanical loading, the first spiral tongue fails before the second spiral tongue.

20 Claims, 1 Drawing Sheet

(56) References Cited

U.S. PATENT DOCUMENTS

2002/0192076 A1* 12/2002 Hansen .................. F01D 9/026
                                                    415/184
2013/0287560 A1* 10/2013 Osako ..................... F01D 9/026
                                                    415/204
2014/0219836 A1*  8/2014 Houst .................... F04D 25/04
                                                    417/406
2015/0050131 A1*  2/2015 Sloss ...................... F01D 9/026
                                                    415/177

* cited by examiner

US 10,302,007 B2

TURBINE HOUSING AND ASSOCIATED EXHAUST-GAS TURBOCHARGER

CROSS-REFERENCE TO RELATED APPLICATIONS

This application claims priority to German Patent Application No. 10 2015 205 329.6, filed Mar. 24, 2015, the contents of which are hereby incorporated by reference in its entirety.

TECHNICAL FIELD

The present invention relates to a turbine housing having two spiral-shaped exhaust-gas channels which are separated from one another by way of a partition. The invention also relates to an exhaust-gas turbocharger having a turbine housing of said type.

BACKGROUND

In exhaust-gas turbochargers, use is often made of two-channel turbine housings (so-called twin-scroll turbine housings) which have two spiral-shaped exhaust-gas channels which are separated from one another as far as the exhaust-gas or exhaust-gas turbine. Said two spirals or exhaust-gas channels are delimited radially toward the outside by the spiral outer wall of the turbine housing and radially toward the inside by two tongue-like turbine housing delimitations which project into the exhaust-gas inlet of the exhaust-gas turbine. In the axial direction, the two exhaust-gas channels are separated from one another by a so-called partition. The two spiral tongues are subject to extremely high thermomechanical loading owing to the start-stop cycles during operation and the associated component temperature gradients and the dwell times at maximum exhaust-gas temperature, and this may have the effect that, during the operating duration of an exhaust-gas turbocharger of said type, cracks occur in the two spiral tongues already at a relatively early stage owing to the high thermomechanical loading. In most applications, said cracks grow further during the further course of operation, and in the worst case, can lead to a through-running crack, which ultimately leads to total failure of the exhaust-gas turbocharger owing to the leakage of hot gas that then occurs. Here, it has been found that the two spiral tongues of such twin-scroll turbine housings constitute one of the limiting elements with regard to the maximum admissible exhaust-gas temperature and the maximum admissible mass flow.

SUMMARY

The present invention is therefore concerned with the problem of specifying an improved or at least alternative embodiment for a turbine housing of the generic type, which is characterized in particular by an improved life expectancy.

Said problem is solved according to the invention by way of the subject matter of independent claim(s). The dependent claims relate to advantageous embodiments.

The present invention is based on the general concept of providing, in the case of a turbine housing having two spiral-shaped exhaust-gas channels, such as is known per se, a type of predetermined breaking point which forces a defined failure of a spiral tongue under critical thermomechanical loading, and thus reliably prevents the formation of a crack running through the turbine housing, with associated leakage of hot gas. The two spiral-shaped exhaust-gas channels are in this case separated from one another by way of a partition and are delimited radially to the outside by the turbine housing and radially to the inside by in each case one spiral tongue. Here, said two spiral tongues extend in opposite directions away from the partition in the direction of the turbine housing, wherein the first spiral tongue extends between the partition and an exhaust pipe-side region of the turbine housing, and the second spiral tongue extends between the partition and a bearing housing-side region of the turbine housing. According to the invention, the two spiral tongues are formed such that, under increasing thermomechanical loading, the first spiral tongue fails first.

The first spiral tongue is thus designed to be weaker than the second spiral tongue, which has the effect that, in the event of supercritical thermomechanical loading, said first spiral tongue cracks first, and thus a defined failure behaviour can be precisely defined. Normally, it is also only the second spiral tongue that is primarily a risk of cracking and also leads, in the event of cracking, to a growth of the crack through the turbine housing and thus also to the leakage of hot gas that is to be avoided, for which reason the invention proposes that the first spiral tongue be formed as a so-called sacrificial tongue and that cracking thereof be accepted in order that the functionality of the turbine housing, and furthermore also of the exhaust-gas turbocharger as a whole, can be maintained.

By virtue of the first spiral tongue, which is not at risk of forming through-running cracks, being formed as a so-called "sacrificial tongue", it is possible to relieve the second spiral tongue, which is at risk of forming through-running cracks, of thermomechanical load. This can be achieved for example by virtue of the first spiral tongue having a considerably reduced wall thickness in relation to the second spiral tongue, such that it is conceivable for the wall thickness $d_1$ of the first spiral tongue to amount to for example only approximately 50 to 90% of the wall thickness $d_2$ of the second spiral tongue. By virtue of the first spiral tongue being formed with a relatively small wall thickness, it is furthermore possible to realize a material and weight saving, which is particularly advantageous in particular in comparison with a cumbersome and also expensive increase of the wall thicknesses of the second spiral tongue. Furthermore, it is possible in this way to reduce the required thermomechanical optimization loops and associated simulation and design outlay. Here, the formation of the first spiral tongue with a relatively small wall thickness can be realized by way of simple modification of a casting tool, if the turbine housing itself is formed as a cast component, for example as a cast steel component. With a turbine housing formed in this way, it is also possible to realize a more reliable design of the latter, and in particular, a turbine housing of said type can be operated reliably even at relatively high exhaust-gas temperatures.

In an advantageous refinement of the solution according to the invention, the turbine housing, the partition and the spiral tongues are formed in one piece. This is possible for example if the turbine housing is in the form of a cast metal component, for example in the form of a cast steel component. In this way, the turbine housing according to the invention can, in relation to turbine housings known from the prior art, be realized with the same outlay but with reduced weight, reduced material usage and thus also reduced costs.

The invention is furthermore based on the general concept of using a turbine housing as described above in an exhaust-gas turbocharger for a motor vehicle, whereby a charger device of said type can be of altogether more temperature-resistant design.

Further important features and advantages of the invention will emerge from the subclaims, from the drawings and from the associated description of the figures on the basis of the drawings.

It is self-evident that the features mentioned above and the features yet to be discussed below may be used not only in the respectively specified combination but also in other combinations or individually without departing from the scope of the present invention.

Preferred exemplary embodiments of the invention are illustrated in the drawings and will be discussed in more detail in the following description, with the same reference designations being used to denote identical or similar or functionally identical components.

DETAILED DESCRIPTION

Figure 1:
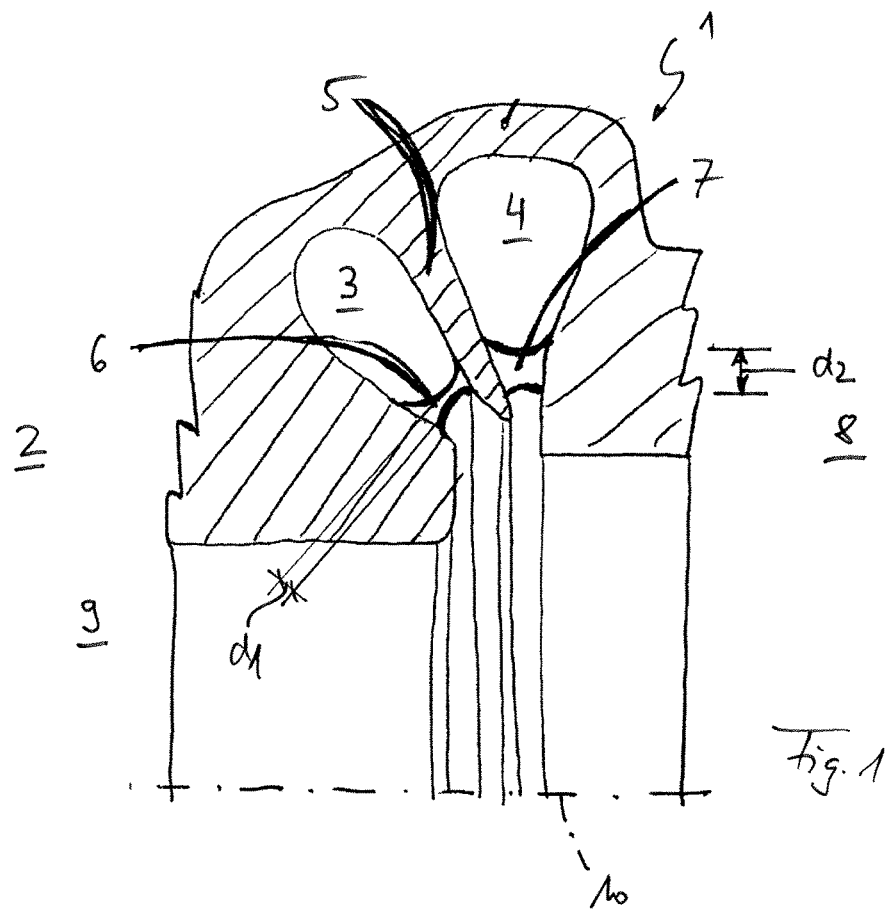
FIG. 1 is a sectional illustration through a turbine housing according to the invention of an exhaust-gas turbocharger.
Figure 2:
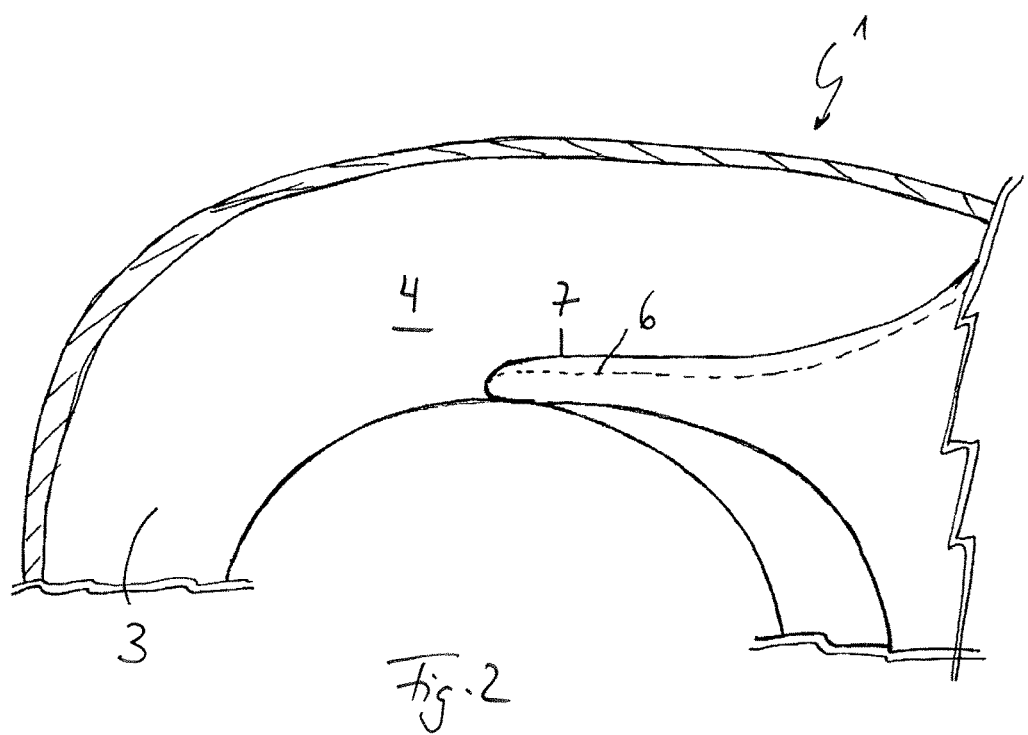
FIG. 2 is likewise a sectional illustration through the turbine housing according to the invention, but in a different section plane.

Correspondingly to FIGS. 1 and 2, a turbine housing 1 according to the invention has an exhaust-gas turbocharger 2 (not otherwise shown) and has two spiral-shaped exhaust-gas channels 3, 4 which are separated from one another by a partition 5 and which are delimited radially to the outside by the turbine housing 1 and radially to the inside by in each case one spiral tongue 6, 7. Here, the two spiral tongues 6, 7 extend in opposite directions away from the partition 5 in the direction of the turbine housing 1. Here, FIG. 1 shows only an upper half of the turbine housing 1, wherein the exhaust-gas channel 4 is arranged adjacent to a bearing housing 8 and the exhaust-gas channel 3 is arranged adjacent to an exhaust pipe 9. Here, during operation of the exhaust-gas turbocharger 2, it is the second spiral tongue 7 in particular that is exposed to high thermomechanical loading and is thus at risk of forming cracks, wherein, in the event of a crack forming in the second spiral tongue 7, crack propagation through the turbine housing 1, which is relatively thin at this location, as far as the outside could occur and thus lead to undesired leakage of hot gas. Here, according to the invention, the two spiral tongues 6, 7 are designed such that, under increasing thermomechanical loading, the first spiral tongue 6 fails first. This may be realized for example by way of different strengths, wherein the strength of the first spiral tongue 6 is lower than the strength of the second spiral tongue 7, such that, in the event of a critical thermomechanical load being reached, it is always the case that the first spiral tongue 6 cracks first, and thus the second spiral tongue 7 can be relieved of load.

The first spiral tongue 6 thus has a type of predetermined breaking point or is formed as a sacrificial tongue and, in the event of a critical temperature loading being reached, prevents the formation of through-running cracks in the second spiral tongue 7 and the associated crack propagation through the turbine housing 1, which must imperatively be avoided.

In order to realize the different strengths of the two spiral tongues 6, 7 in a simple manner, the two spiral tongues 6, 7 have different wall thicknesses $d_1$, $d_2$, as can also be clearly seen from FIG. 2. For example, the first spiral tongue 6 has a wall thickness $d_1$ which corresponds to only approximately 50 to 90% of the wall thickness $d_2$ of the second spiral tongue 7, such that, in the event of a critical mechanical loading being reached, it is always the case that the first spiral tongue 6 cracks first. It would self-evidently also be possible in the same way for a predetermined breaking point to actually be provided, for example in the form of a cross-sectional narrowing, in the region of the first spiral tongue 6.

In general, the turbine housing 1 and the partition 5 may be formed in one piece, wherein furthermore, it is self-evidently possible for the two spiral tongues 6, 7 to also be formed in one piece with the turbine housing 1. For this purpose, it is for example possible for the turbine housing 1 to be produced as a metallic cast component, for example from cast aluminium. The two exhaust-gas channels 3, 4 are in this case situated axially adjacent to one another in relation to an axis of rotation 10.

In general, in the case of the turbine housing 1 according to the invention, the risk of a hot-gas leakage crack exists only in the event of cracking of the second spiral tongue 7; by contrast, in the case of the first spiral tongue 6, such a hot-gas leakage crack is not possible owing to the geometric situation of the twin-scroll spiral under the prevailing loading conditions. For this reason, according to the invention, the first spiral tongue 6 is designed to be weaker than the second spiral tongue 7, such that the first spiral tongue 6 can be used as a sacrificial tongue and thus for relieving the second spiral tongue 7, which is at risk of forming through-running cracks, of thermomechanical load. In the event of a superficial crack or a through-running crack forming in the first spiral tongue 6, the second spiral tongue 7 is still far from reaching its strength limit, wherein, in the event of a through-running crack forming in the first spiral tongue 6, the second spiral tongue 7 is simultaneously mechanically relieved of load, and a risk of hot-gas leakage cracks in the region of the two spiral tongues 6, 7 can be reduced. In this way, it is possible in particular to realize a longer service life of the turbine housing 1.

By way of the embodiment of the first spiral tongue 6 with reduced material usage and simultaneously relatively low weight, it is possible not only for the life expectancy and the thermomechanical load capacity of the turbine housing 1 according to the invention to be increased, but furthermore also for material and weight savings to be achieved, because in particular, in order to prevent thermomechanical cracks in the second spiral tongue 7, the latter no longer has to be mechanically reinforced. Furthermore, it is possible to realize a reduction in the required thermomechanical optimization loops and thus also a reduction in simulation and design outlay. It is likewise possible to reduce a number of tests for component strength certification on the engine or on a hot-gas test stand. The turbine housing 1 according to the invention may in this case be realized in simple form through modification of a corresponding casting tool. It is furthermore highly advantageous that the turbine housing 1 according to the invention can also be operated at higher gas temperatures than similar turbine housings hitherto known from the prior art.

The invention claimed is:

1. A turbine housing of an exhaust-gas turbocharger, comprising:

at least two spiral-shaped exhaust-gas channels separated from one another via a partition, the at least two spiral-shaped exhaust-gas channels being delimited radially to the outside by an inner surface of the turbine housing and radially to the inside by at least two spiral tongues, wherein the at least two spiral tongues are respectively associated with one of the at least two spiral-shaped exhaust-gas channels and extend in opposite directions away from the partition, wherein the at least two spiral tongues include a first spiral tongue and a second spiral tongue, wherein the first spiral tongue extends between the partition and an exhaust pipe-side region of the turbine housing, and the second spiral tongue extends between the partition and a bearing housing-side region of the turbine housing, and wherein the at least two spiral tongues are configured such that, under an increasing thermomechanical loading, the first spiral tongue fails before the second spiral tongue;

wherein the first spiral tongue has a smaller wall thickness and a lower strength than the second spiral tongue; and wherein one of the first and second spiral tongues include a first concave surface facing toward a respective spiral-shaped exhaust-gas channel.

2. The turbine housing according to claim 1, wherein the first spiral tongue has a wall thickness of approximately 50% to approximately 90% of a wall thickness of the second spiral tongue, wherein the first spiral tongue has a lower strength than the second spiral tongue.

3. The turbine housing according to claim 1, wherein at least the turbine housing and the partition are formed in one piece.

4. The turbine housing according to claim 1, wherein the turbine housing, the partition and the at least two spiral tongues are formed in one piece, and wherein the first spiral tongue has at least one of a smaller wall thickness and a lower strength than the second spiral tongue.

5. The turbine housing according to claim 1, wherein the turbine housing is a cast part.

6. The turbine housing according to claim 1, wherein the at least two exhaust-gas channels are arranged axially adjacent to one another.

7. The turbine housing according to claim 1, wherein one of the first and second spiral tongues includes the first concave surface facing toward its respective spiral-shaped exhaust-gas channel, and the other of the first and second spiral tongues includes a second concave surface facing toward its respective spiral-shaped exhaust-gas channel.

8. The turbine housing according to claim 7, wherein one of the first and second spiral tongues includes a third concave surface opposing the first concave surface and facing away from the respective spiral-shaped exhaust-gas channel, and the other of the first and second spiral tongues includes a fourth concave surface opposing the second concave surface and facing away from the respective spiral-shaped exhaust-gas channel.

9. The turbine housing according to claim 1, wherein the housing is a twin-scroll turbine housing.

10. An exhaust-gas turbocharger for a motor vehicle, comprising: a turbine housing, the turbine housing including:

at least two spiral-shaped exhaust-gas channels separated from one another via a partition, the at least two spiral-shaped exhaust-gas channels being delimited radially to the outside by the turbine housing and radially to the inside by at least two spiral tongues, wherein the at least two spiral tongues include a first spiral tongue associated with one of the at least two spiral-shaped exhaust-gas channels and a second spiral tongue associated with the other of the at least two spiral-shaped exhaust-gas channels, and wherein the at least two spiral tongues extend in opposite directions from the partition in a direction towards the turbine housing;

wherein the first spiral tongue extends between the partition and an exhaust pipe-side region of the turbine housing, and the second spiral tongue extends between the partition and a bearing housing-side region of the turbine housing; and wherein the at least two spiral tongues are configured such that, under an increasing thermomechanical loading, the first spiral tongue fails before the second spiral tongue;

wherein the first spiral tongue has a smaller wall thickness and a lower strength than the second spiral tongue; and wherein at least one of the first and second spiral tongues include a first concave surface facing toward a respective spiral-shaped exhaust-gas channel.

11. The exhaust-gas turbocharger according to claim 10, wherein the first spiral tongue has a wall thickness of approximately 50% to approximately 90% of a wall thickness of the second spiral tongue.

12. The exhaust-gas turbocharger according to claim 11, wherein the turbine housing, the partition and the at least two spiral tongues are configured in one piece.

13. The exhaust-gas turbocharger according to claim 10, wherein at least the turbine housing and the partition are configured in one piece.

14. The exhaust-gas turbocharger according to claim 10, wherein the turbine housing, the partition and the at least two spiral tongues are configured in one piece.

15. The exhaust-gas turbocharger according to claim 10, wherein the turbine housing is a cast part.

16. The exhaust-gas turbocharger according to claim 15, wherein the cast part is a cast steel component.

17. The exhaust-gas turbocharger according to claim 10, wherein the at least two exhaust-gas channels are arranged axially adjacent to one another, wherein the turbine housing and the partition are configured in one piece.

18. The exhaust-gas turbocharger according to claim 10, wherein one of the first and second spiral tongues includes the first concave surface facing toward its respective spiral-shaped exhaust-gas channel, and the other of the first and second spiral tongues includes a second concave surface facing toward its respective spiral-shaped exhaust-gas channel.

19. The exhaust-gas turbocharger according to claim 18, wherein one of the first and second spiral tongues includes a third concave surface opposing the first concave surface and facing away from the respective spiral-shaped exhaust-gas channel, and the other of the first and second spiral tongues includes a fourth concave surface opposing the second concave surface and facing away from the respective spiral-shaped exhaust-gas channel.

20. The exhaust-gas turbocharger according to claim 10, wherein the two spiral-shaped exhaust-gas channels are in a twin-scroll turbine arrangement.

* * * * *